US005278711A

United States Patent [19]

Gregory et al.

[11] Patent Number: 5,278,711

[45] Date of Patent: Jan. 11, 1994

[54] SLIDER BEARING DESIGN FOR NEAR CONTACT MAGNETIC RECORDING

[75] Inventors: Thomas A. Gregory, Rochester, Minn.; Christopher G. Keller, Albany, Calif.; Thomas S. Larson, Altura, Minn.

[73] Assignee: International Business Machines Corporation, Armonk, N.Y.

[21] Appl. No.: 963,785

[22] Filed: Oct. 20, 1992

Related U.S. Application Data

[60] Division of Ser. No. 689,671, Apr. 23, 1991, which is a continuation of Ser. No. 264,604, Oct. 31, 1988, abandoned.

[51] Int. Cl.[5] .......... G11B 5/60
[52] U.S. Cl. .......... 360/103
[58] Field of Search .......... 360/103

[56] References Cited

U.S. PATENT DOCUMENTS 3,754,104 8/1973 Piper .......... 360/103
4,757,402 7/1988 Mo .......... 360/103
5,200,867 4/1993 Albrecht .......... 360/103

*Primary Examiner*—A. J. Heinz
*Attorney, Agent, or Firm*—Bradley A. Forrest; Richard E. Billion; Roy W. Truelson

[57] ABSTRACT

A rotating magnetic storage device is shown wherein the transducer and media are separated during operation by a thin film of low viscosity liquid lubricant that is recirculated from a reservoir within the head-media enclosure. Lubricant recirculation can be effected by capillary action using a wick, mechanical pumping and metering or distillation techniques. As compared to devices using air bearing separation, the transducer carrying slider has very small bearing surfaces which may be in the form of narrow rails or small depending foot elements. This enables fly heights of 2 microinches using a film of one micron thickness.

14 Claims, 5 Drawing Sheets

33 30 34 29

25

33 28 30 34

28 33 30 34

SLIDER BEARING DESIGN FOR NEAR CONTACT MAGNETIC RECORDING

RELATED APPLICATIONS

This is a divisional application of U.S. patent application Ser. No. 07/689,671, filed Apr. 23, 1991, which is a file wrapper continuation of U.S. patent application Ser. No. 07/264,604, filed Oct. 31, 1988, now abandoned.

FIELD OF THE INVENTION

The present invention is directed to magnetic data storage devices and more particularly to a magnetic data storage device within a substantially sealed enclosure that has the transducer separated from the media by a thin film of recirculated, low viscosity liquid lubricant.

BACKGROUND OF THE INVENTION

State of the art magnetic disk drives presently, and for some time have used a transducer carrying slider which flies over the media surface and is separated therefrom by a film of air. As recording densities become greater, the head is required to fly lower and the magnetic layer of the media becomes thinner. When the spacing between head and media is reduced from 25 or more microinches to fewer than ten microinches and the media magnetic layer thickness is reduced from as much as 50 to fewer than 5 microinches, the physical contact that occasionally occurs between head and media is of major concern.

To provide an acceptable rigid disk drive lifetime, the current technology employs a thin layer of a fluorocarbon lubricant applied to the magnetic medium during manufacture of the disk. This lubricant film is critically needed by the head/disk interface (HDI) to minimize wear to these components and significantly extend the lifetime of the disk drive to an acceptable level. A problem with this technology arises from depletion of the lubricant film with use. The loss of lubricant can be attributed to hydrodynamic ejection from the HDI due to air shear phenomena, thermal volatilization, thermal decomposition followed by bonding to the medium and lubricant spinoff.

These, and other wear processes at the HDI increase as the lubricant is lost and ultimately result in failure. The total wear to the HDI can be categorized into two distinct modes; first, a rapid wear rate that occurs during start/stop operations and second, a slower wear rate due to repeated high speed contacts at the HDI during normal file operations (disk at or near maximum speed). Wear associated with the start/stop process is only slightly dependent on head fly height, whereas for the latter case, a lowering of the fly height will dramatically increase the wear rate at disk drive operating speed (flyability). The increase for this latter case has been attributed to an increase in the collision frequency with disk asperities and debris (both foreign and from generated wear products). In this case, the presence of a lubricant film plays a critical role in protecting the HDI, but with the reduction in head fly height the lubricant film is also depleted more rapidly. Thus, for these reasons a reduction in flying height greatly increases the likelihood of early disk drive failure. The reason for reducing head flying height is to obtain an increase in the magnetic storage density. An additional problem encountered here is to also reduce the wear rate to the head gap. For these reasons, and because of their relationship to disk drive reliability, the current technology is limited by the achievable lowest flying height as a barrier to further increases in data storage density.

A proposed technique for providing a continuous lubricant supply for a magnetic media surface is shown in U.S. Pat. Nos. 2,969,435 and 3,005,675. In both patents a supply of lubricant is sprayed onto the disk or drum surface ahead of the area of contact between transducer head and media surface. This mode of placing a layer of lubricant on the media surface would not be compatible with the system of the present invention wherein a transducer is made to adjoin the media during relative motion therebetween with a separation of but 1 or 2 microinches. A later patent, U.S. Pat. No. 4,633,351 attempts to overcome some of the problems associated with the earlier patented techniques by spraying water or a volatile liquid solvent ahead of the transducer to create a thin liquid film between the head and the recording media surface.

SUMMARY OF THE INVENTION

The present invention resolves the reliability problem associated with near contact recording by supplying a recirculating film of liquid lubricant with the transducer head supported on a lubricant film rather than on a layer of air. The higher viscosity and lack of compressibility of the fluid film separating the transducer and storage medium allows the transducer to be reliably maintained at a significantly lower fly height. A separation of one to two microinches between the transducer carrying slider and the disk surface can be maintained.

The system includes a wick structure that carries liquid lubricant from the reservoir at the lowest point in the head disk enclosure to the disk at the inner diameter of the disk storage surface by capillary action. The liquid is gradually spun by the centrifugal force of the spinning disk to the periphery from which it leaves as minute droplets to return by gravity to the reservoir. The wick structure may be formed of any absorbant material that does not shed particulate matter within the enclosure. It may take the form of a porous plastic or even be made of a material such as a type of "clean room" paper that is highly absorbant while having the property of not releasing fibers or other constituents of which it is composed as particulate debris.

The liquid lubricant also differs in character from that used in conventional systems that use air bearings and storage disks with permanently applied lubricants. The lubricant may be similar to such formulations, but has a much lower viscosity to provide the desired thin lubricant film at the disk rotational speeds and the environmental temperature range in which the drive is required to function.

Although the transducer head suspensions used in the practice of the invention can be the same as used in air bearing type system, typically of the Winchester or Whitney designs, the slider or transducer head structure must be modified to adapt to the use of a liquid film rather than an air film. Instead of the multiple rails that present air bearing surfaces, the modified slider can use a single rail with a very narrow bearing surface or an even more effective design that present three minute triangular feet. In the latter design one foot adjoins the leading edge and two are at the trailing edge and terminate rearwardly at the thin film transducers. Thus a much smaller bearing surface is used with the more viscous bearing fluid.

DETAILED DESCRIPTION

Figure 1:
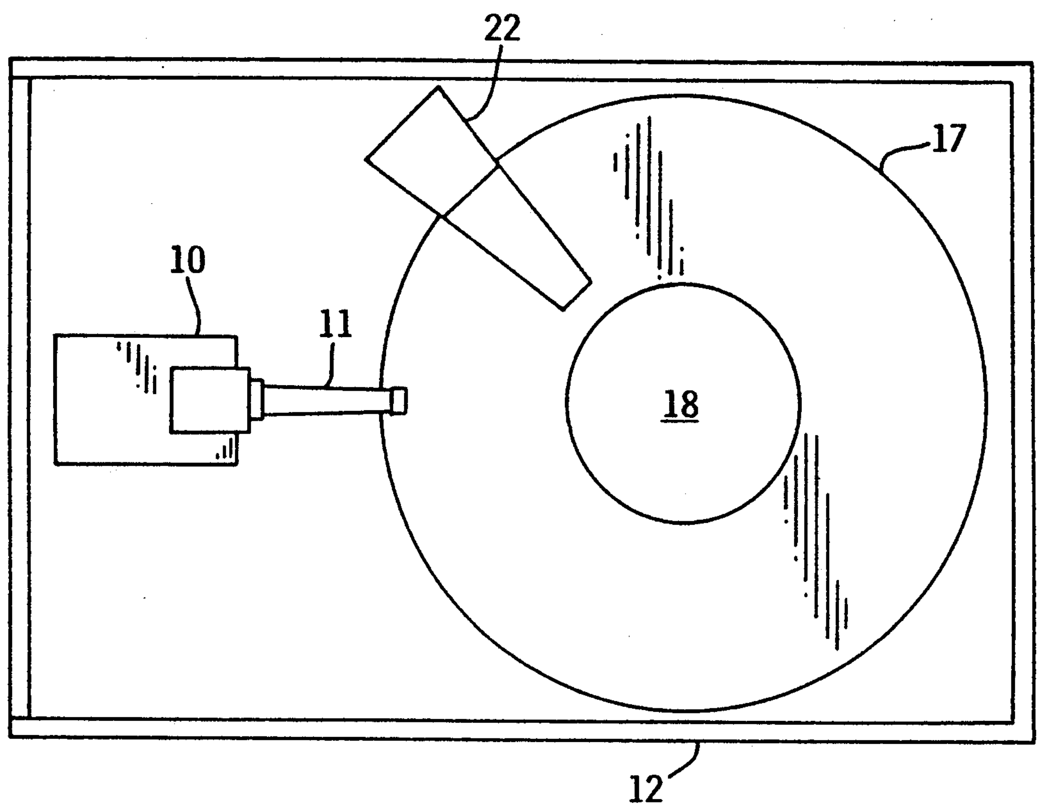
FIG. 1 is a schematic plan view with the cover removed showing a disk drive incorporating the present invention.
Figure 2:
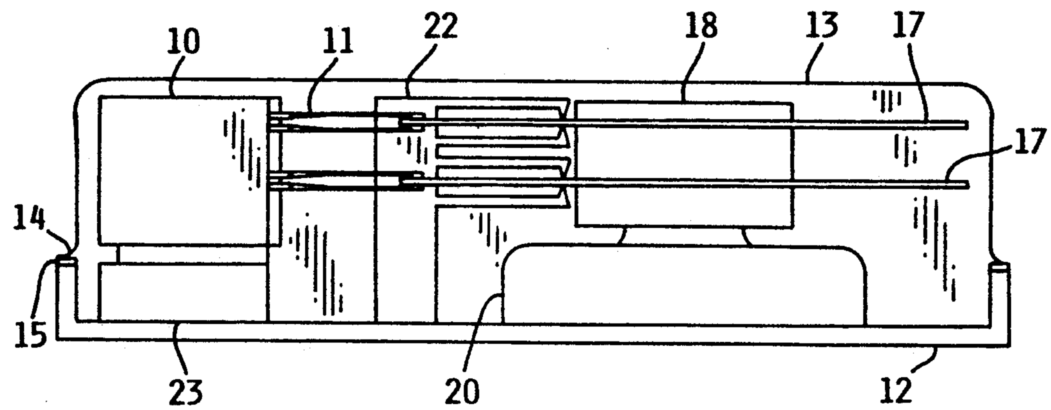
FIG. 2 is a vertical section of the disk drive of FIG. 1.

FIGS. 1 and 2 respectively show a schematic plan view of a drive with the cover removed and a sectional elevation. Illustrated is a typical rigid disk drive with a linear voice coil motor (VCM) driven actuator 10. The actuator 10 drives a head-arm assembly which may include typical head suspension devices 11 such as the common Winchester or Whitney suspension designs. The head assembly is contained within an enclosure including a cast base member 12 which also serves as a liquid lubricant reservoir and a cover 13 which has a flange 14 that compresses a gasket 15 against the upper planar surface of the base 12 casting to effect a seal. The rigid disk media 17 are carried by the hub 18 that is mounted to rotate in unison with the rotor of a spindle motor positioned within an upwardly extending depression 20 in base 12. The motor shaft extends through a bearing tower to connect to the hub 18.

The liquid lubricant used in the system of the present invention is required to be thermally stable, have a correct viscosity which is very low and be non-reactive. A simple, straight chain hydrocarbon with the desired low viscosity and a simple molecule that will not degrade is recommended. In operation, hexadecane has been used. Lubricants commonly used on disk surfaces, but having much reduced viscosity are satisfactory. However, with the greater quantity of lubricant used in the present technique as compared with the quantity required for the normal single application to the disk surface, the cost of the material becomes a factor in lubricant selection. A wick structure 22 is formed of porous material, such as plastic, ceramic or paper. The wick structure 22 must possess porosity to permit liquid lubricant to travel by capillary action from the reservoir 23 formed in base 12 to the media surface in minute quantities to replenish and maintain a film of lubricant on the media surfaces. The material of the wick 22, in addition to providing a capillary path, must also not shed particles and thereby become a source of particulate material within the enclosure. The film thickness should preferably be one micron and should not exceed 5 microns, since as the film thickness increases, the power required to drive the heads through the lubricant film increases. As the lubricant is spun off the disk and replaced, the wick 22 also functions as a lubricant filter to prevent the recirculation of particles captured in the liquid lubricant back to the media surfaces.

To minimize wear between the wick and the location of contact at the ID of the disk, the wick should generate lift and 'fly' like the slider. The loading pressure of the wick on the disk can be much lighter than for the slider, because the sliding height can be much higher and less tightly controlled.

Figure 6:
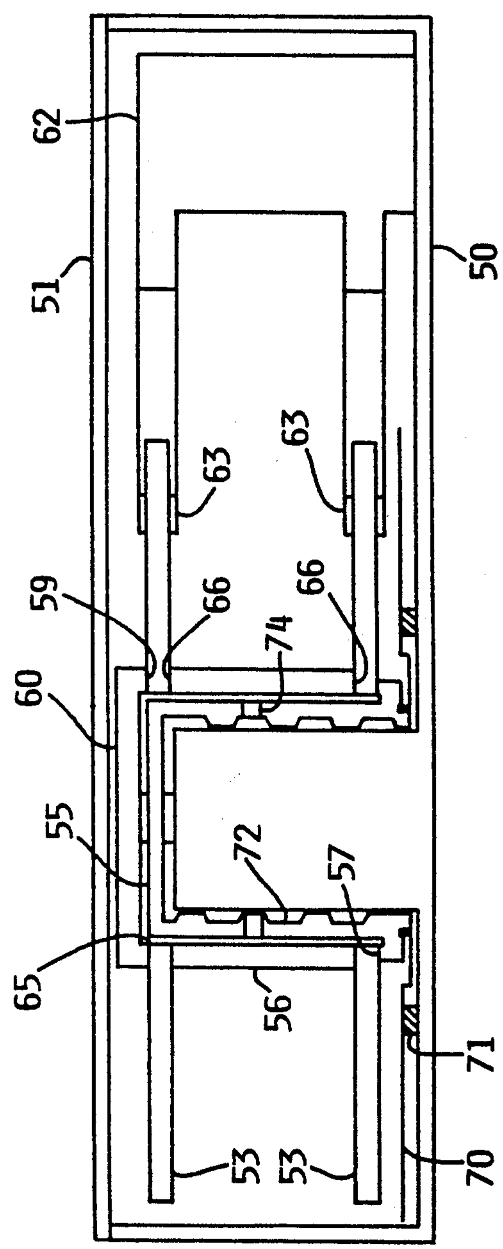
FIG. 6 is a schematic showing of an alternative embodiment of a disk drive lubricant recirculating system using a pumping action integral with the hub-disk assembly.
Figure 7:
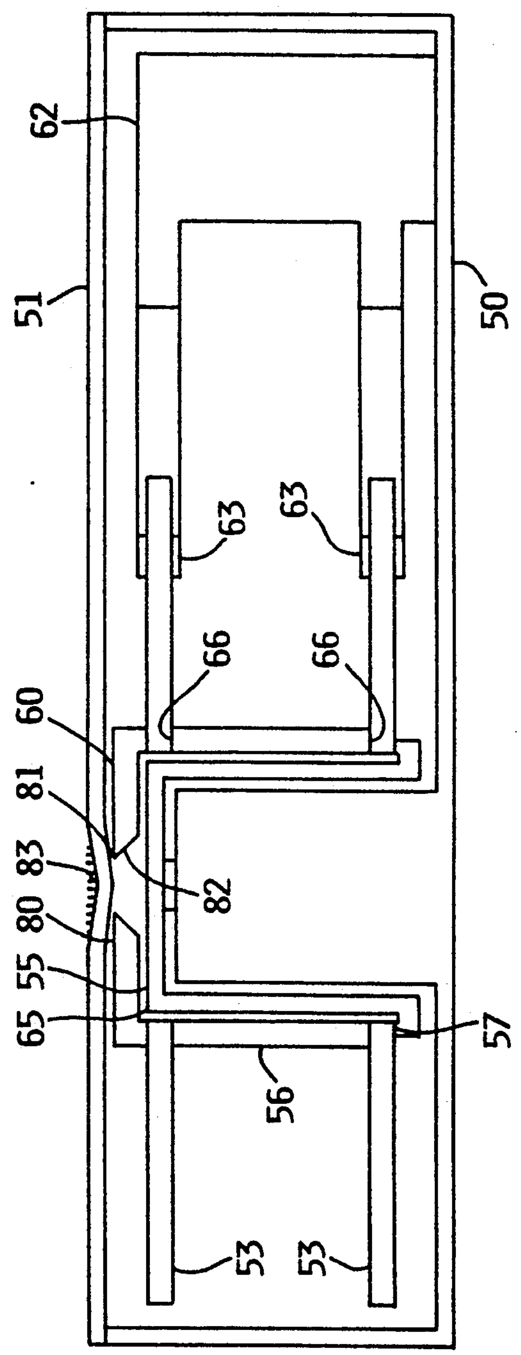
FIG. 7 is a schematic showing of a further alternative embodiment of a lubricant recirculating system using a distillation technique.

Recirculation need not be accomplished using a wick structure. Two alternative methods are illustrated in FIGS. 6 and 7. Lubricant can be transported with no contacting parts using the left handed spiral passage of the embodiment of FIG. 6 or the distillation technique of FIG. 7.

FIGS. 6 and 7 show a base casting 50 that defines a liquid reservoir and is enclosed by a base cover 51. Disks 53 are mounted for rotation on a hub 55 and separated by a spacer 56. The disks 53 are compressively retained between a hub flange surface 57 and a confining surface 59 on the clamping member 60. An actuator 62 mounts the transducer heads 63 for movement between concentric tracks on the disk surfaces. Lubricant is supplied to the annular space 65 between the hub 55 and the assembly of disks 53 and spacer 56. Radial scratches or recesses in the hub surface 57, clamp surface 59 and the upper and lower spacer surfaces 66 provide a passage for the lubricant from the annular space 65 to the disk surfaces, with the size of such passages affording the limitation on the rate of fluid distribution to the respective disk surfaces.

In FIG. 6, a thin plate member 70 isolates the fluid in the reservoir volume from the windage effect of the confronting rotating disk surfaces and permits the lubricant to flow radially inward toward hub 55 through an annular filter 71. The hub has a left handed spiral recess 72 formed in the inner surface that draws lubricant upward as the hub assembly rotates for delivery through the radial passages 74 to the annular space 65.

The method of recirculation by distillation (FIG. 7) is most effective in the case of a hermetically sealed file with the lubricant under its own vapor pressure (no air present). The lubricant evaporates from the warmer parts of the file and condenses on the relatively cool cover 51. The cover is contoured with a conical depression 80 such that the condensate will drain to a point directly above the spinning hub assembly and drip into a hub clamp member opening 81. The passage through the clamp member opening has a conical side wall surface 82 that increases in diameter in the downward direction so that centrifugal force will not fling the liquid out of the passageway. In operation, the distillation should proceed slightly faster than the lubricant flow rate required for the disks so that the intermediate reservoir at the top of the hub will remain full. Excess lubricant overflows from the top of the hub and is flung harmlessly to the file walls.

In the device of FIG. 7, the heat generated by an electronic circuit card (not shown) below the head-disk enclosure and the heat generated by the motor will be sufficient to drive this distillation process. The top cover 51 is the coolest area of the drive enclosure and localized cooling is provided at the contoured, conical surface 80 overlying the hub by the provision of cooling fins 83 at the outer surface. In this mode of lubricant recirculation a filter is not required since particulate material is retained in the reservoir and is not recirculated with the lubricant vapor.

Although many of the drive system assemblies, such as the actuator 10, transducer suspensions 11 and disk assemblies, are of conventional design, the head structure is a total departure from the normal slider designs used with the more common transducers that are separated from the media surface by a film of air.

Initially a three rail head was used with the rails reduced in width to reduce the fluid bearing surface to meet the needs of a system using a liquid film rather than a film of air to support a slider above the recording surface. This emulated the air bearing sliders which have been the most successful in current practice while using a reduced bearing area in response to the recognized greater supporting capability of a liquid film.

Figure 3:
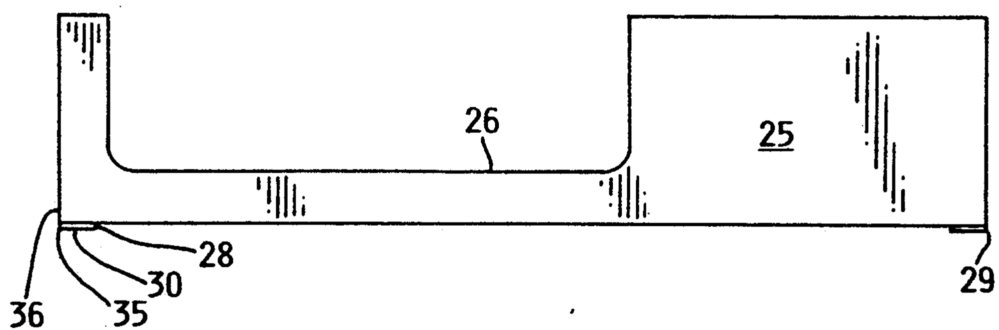
FIG. 3 is a side elevation of a transducer head structure used in the practice of the present invention.

A further development resulted in the slider 25 shown in FIG. 3 which is of normal length, about 4 millimeters and has a mounting grove 26 to permit attachment to the gimbal spring structure of a standard Winchester suspension; however, the bearing surfaces are wholly different. As more clearly seen in the bottom view of FIG. 4, instead of the rails or other air bearing surfaces or even very narrow rails with greatly reduced air bearing surface areas, the bearing surfaces are more optimally provided by the three very small feet 28, 29.

Figure 4:
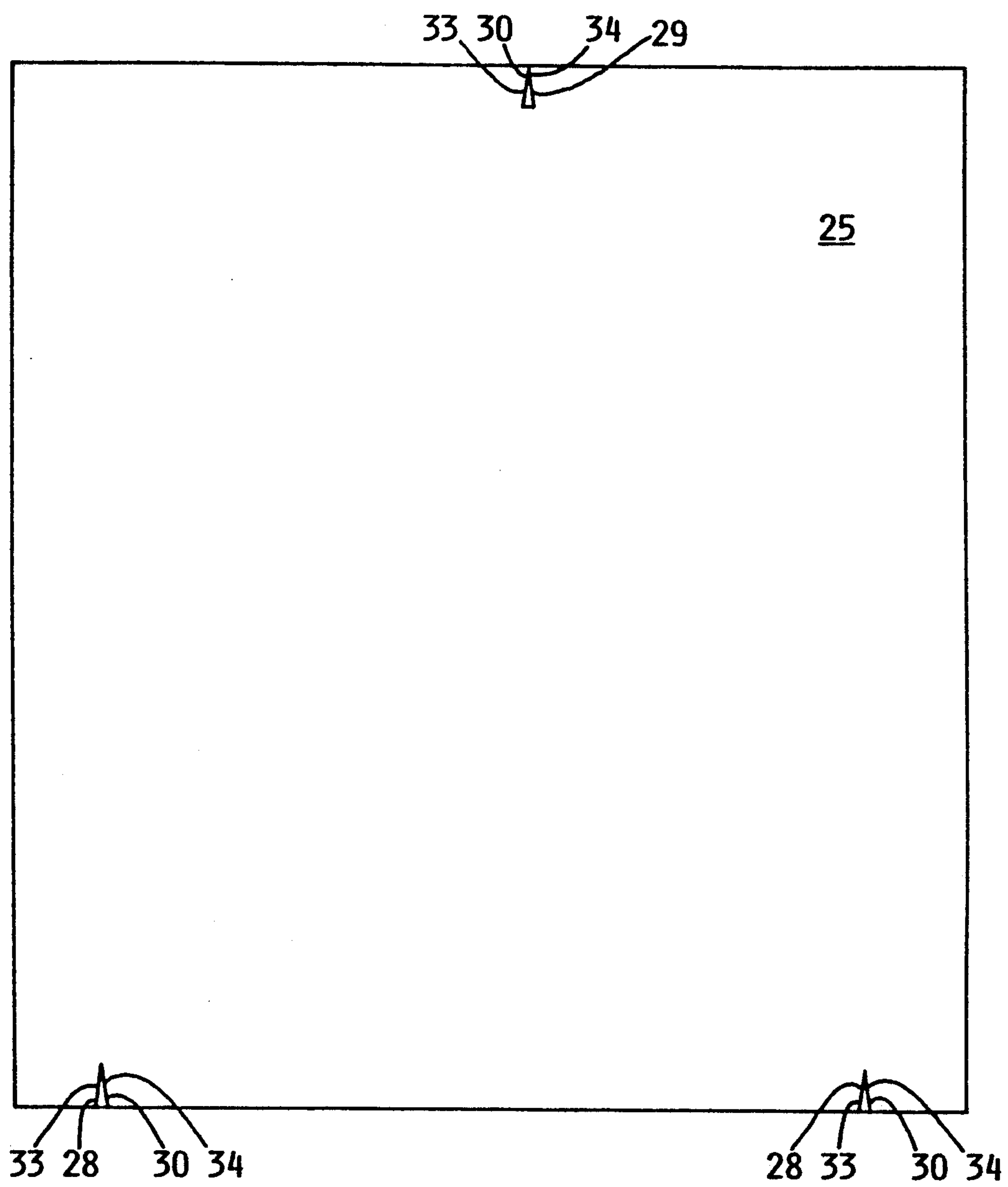
FIG. 4 is a bottom view of the head shown in FIG. 3.
Figure 5:
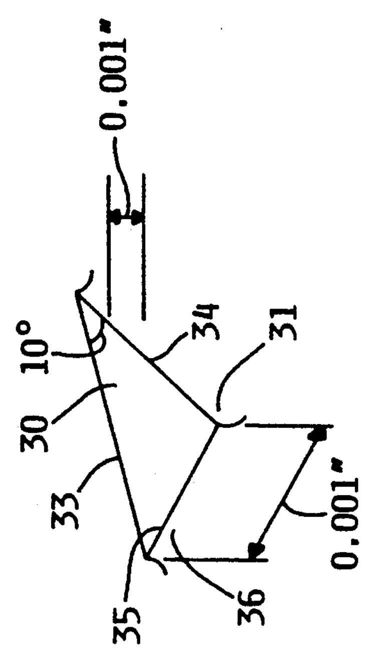
FIG. 5 shows the structure of one of the feet that present the bearing surface upon which the slider is supported.

The modified slider structure is shown in FIGS. 3 through 5. The slider as illustrated has substantially the same overall dimensions as the air bearing sliders used in current product lines, a length of 4.025 millimeters, a width of 3.207 millimeters and a height of less than one millimeter. The feet 28, 29; however, are short, narrow and present very minute fluid bearing surfaces 30. The feet can be 0.0057 inches in length with a triangular form. The surface includes a 10 degree included angle at the leading end and is only 0.001 inch wide at the trailing edge. Each foot depends downwardly from the lower surface of the slider body a distance of 25 to 50 microns with the foot side walls 31 that extend to join the lower slider surface curved to blend into the slider body. This provides greater strength for the physically small foot. Because the bearing surface is so small, the slider body could be made much smaller than that shown which was based on dimensions used for air bearing type sliders.

In addition to two rail and three rails sliders with reduced area rail bearing surfaces, that are suggested by the prior art air bearing sliders and the three triangular foot configuration that is shown and described, numerous other bearing surface configuration are operable. The number of triangular feet may be varied and the positioning of the feet can be changed. Also, other bearing surface shapes can be used such as rectangular feet.

As seen in FIG. 5, the 10 degree included angle at the leading edge of the foot is between one side 33 that extends parallel to the axis of the slider and the other side 34 is inclined thereto. The side of the foot parallel to the slider axis is disposed toward the disk inner diameter and the inclined surface is positioned facing the outer diameter. This angled relationship of the triangular sides of the feet 28, 29 extending from the foot leading portion enable the lubricant film and any minute debris that might be included therein to be deflected toward the disk outer diameter and ultimately, off the disk. The transducer or transducers carried by the slider 25 are of the thin film type mounted on the rear surface 36 and presenting the transducing gap at the edge 35 of the foot 28.

Ferrite core heads have also been made and the magnetic performance demonstrated. With such heads, the glassed gap is incorporated into one (or more) of the feet at the point where the foot width is equal to the desired magnetic track width.

The depth of the lubricant film does not exceed 5 microns and preferably has a thickness of about 1 micron. The feet 28, 29 which are 25 to 50 microns in height, hold the body of the slider above the lubricant as the bearing surfaces are supported only 1 to 2 microinches above the media surface. The slider has been operated using a 3.5 gram load which causes a pressure at the bearing surface of less than 1000 pounds per square inch. In practice, the pressure is about 800 pounds per square inch across the fluid film at the bearing surface. If a higher gram load is desired, the area of the bearing surfaces can be increased by designing the linear dimensions to be longer, and maintaining the same angles.

While the invention has been particularly shown and described with reference to preferred embodiments thereof, it will be understood by those skilled in the art that changes in form and details may be made therein without departing from the spirit and scope of the invention.

What is claimed is:

1. A transducer assembly for transducing information upon a magnetic recording surface during relative movement between the transducer assembly and the recording surface, said assembly comprising a slider body including at least three spaced downwardly depending foot portions, said slider body having a leading edge and a trailing edge, each of said downwardly depending foot portions having a trailing edge, at lest one of said foot portions being aligned neither longitudinally nor transversely with respect to said slider body with the other of said foot portions;

triangular bearing surfaces respectively presented by bottom surfaces of each of said depending foot portions; and magnetic transducer means at the trailing edge of one of said depending foot portions which presents a transducing gap adjoining the adjacent bearing surface.

2. The transducer assembly of claim 1 wherein said foot portions are adjacent the leading and trailing edges of said slider body.

3. The transducer assembly of claim 2, wherein one of said foot portions is adjacent the leading edge of said slider body, and two of said foot portions are adjacent the trailing edge of said slider body.

4. The transducer assembly of claim 1 wherein said bearing surfaces have one side extending longitudinally and another side extending transversely with respect to said slider body.

5. The transducer assembly of claim 4 wherein said bearing surface transversely extending side is at the trailing edge of said bearing surface.

6. The transducer assembly of claim 5 wherein said transducing gap is presented adjacent said transverse side of one of said bearing surfaces.

7. A disk drive assembly comprising;

a base;

at least one rigid disk having a magnetic recording surface, said disk attached to a rotatable hub mounted on said base;

a spindle motor for rotating said disk;

an actuator for positioning a transducer to access data recorded on said magnetic recording surface;

a suspension attached to said actuator for supporting said transducer;

a transducer assembly attached to said suspension, said transducer assembly comprising:

(a) a slider body including at least three spaced downwardly depending foot portions, said slider body having a leading edge and a trailing edge, each of said downwardly depending foot portions having a trailing edge, at least one of said foot portions being aligned neither longitudinally nor transversely with respect to said slider body with the other of said foot portions, (b) triangular bearing surface respectively presented by bottom surfaces of each of said depending foot portions, and (c) magnetic transducer means at the trailing edge of one of said depending foot portions which presents a transducing gap adjoining the adjacent bearing surface; and a cover mating with said base, thereby enclosing said disk, said actuator, said suspension and said transducer assembly.

8. The disk drive assembly of claim 7, wherein one of said foot portions is adjacent the leading edge of said slider body, and two of said foot portions are adjacent the trailing edge of said slider body.

9. The disk drive assembly of claim 7, wherein said triangular bearing surfaces have one side extending longitudinally and another side extending transversely with respect to said slider body.

10. The disk drive assembly of claim 9, wherein said bearing surface transversely extending side is at the trailing edge of said bearing surface.

11. The disk drive assembly of claim 10, wherein said transducing gap is presented adjacent said transverse side of one of said bearing surfaces.

12. A disk drive assembly comprising:

a base;

at least one rigid disk having a magnetic recording surface, said disk attached to a rotatable hub mounted on said base;

a spindle motor for rotating said disk;

a liquid lubricant covering said magnetic recording surface;

an actuator for positioning a transducer to access data recorded on said magnetic recording surface;

a suspension attached to said actuator for supporting said transducer;

a transducer assembly attached to said suspension, said transducer assembly comprising:

(a) a slider body including at least three spaced downwardly depending foot portions, said slider body having a leading edge and a trailing edge, each of said downwardly depending foot portions having a trailing edge, at least one of said foot portions being aligned neither longitudinally nor transversely with respect to said slider body with the other of said foot portions, (b) bearing surfaces respectively presented by bottom surfaces of each of said depending foot portions, aid bearing surfaces being in contact with and supported by said liquid lubricant during operation of said disk drive assembly, (c) magnetic transducer means at the trailing edge of one of said depending foot portions which presents a transducing gap adjoining the adjacent bearing surface; and a cover mating with said base, thereby forming an enclosure enclosing said disk, said actuator, said suspension and said transducer assembly.

13. The disk drive assembly of claim 12, further comprising means for recirculating said liquid lubricant within said enclosure.

14. The disk drive assembly of claim 12, wherein one of said foot portions is adjacent the leading edge of said slider body, and two of said foot portions are adjacent the trailing edge of said slider body.

* * * * *